(12) United States Patent
Hakola et al.

(10) Patent No.: US 9,426,788 B2
(45) Date of Patent: Aug. 23, 2016

(54) METHODS AND APPARATUS FOR TRANSMITTING AND/OR CONTROLLING DEVICE-TO-DEVICE DISCOVERY SIGNALS

(71) Applicant: Broadcom Corporation, Irvine, CA (US)

(72) Inventors: Sami-Jukka Hakola, Kempele (FI); Matti Pikkarainen, Oulu (FI); Ville Vartiainen, Oulu (FI); Anna Pantelidou, Oulu (FI); Juha Pekka Karjalainen, Oulu (FI); Timo Kalevi Koskela, Oulu (FI); Samuli Turtinen, Ii (FI)

(73) Assignee: BROADCOM CORPORATION, Irvine, CA (US)

( * ) Notice: Subject to any disclaimer, the term of this patent is extended or adjusted under 35 U.S.C. 154(b) by 124 days.

(21) Appl. No.: 13/860,086

(22) Filed: Apr. 10, 2013

(65) Prior Publication Data

US 2013/0273924 A1 Oct. 17, 2013

(30) Foreign Application Priority Data

Apr. 11, 2012 (GB) .................................. 1206372.3

(51) Int. Cl.
 *H04W 72/00* (2009.01)
 *H04W 72/04* (2009.01)
 *H04W 76/02* (2009.01)

(52) U.S. Cl.
 CPC ....... *H04W 72/0413* (2013.01); *H04W 76/023* (2013.01)

(58) Field of Classification Search
 CPC ... H04W 72/04; H04W 76/02; H04W 16/10; H04W 16/14; H04W 28/16; H04W 52/04; H04W 84/18

USPC .................................... 455/41.2, 422.1, 450
See application file for complete search history.

(56) References Cited

U.S. PATENT DOCUMENTS 8,849,290 B2 * 9/2014 Gao .................... H04W 76/023
                                                                 370/329
2008/0144550 A1    6/2008 Makhlouf et al.
(Continued)

FOREIGN PATENT DOCUMENTS

EP          1 557 968 A1      7/2005
EP          2 413 645 A2      2/2012
(Continued)

OTHER PUBLICATIONS

Qualcomm Incorporated, Tdoc-RP-110706, "On the need for a 3GPP Study on LTE device-to-device discovery and communication," 3GPP TSC-RAN #52, Bratislava, Slovakia, May 31-Jun. 2, 2011, (2 pages).

(Continued)

*Primary Examiner* — Temica M Beamer
(74) *Attorney, Agent, or Firm* — Foley & Lardner LLP; Christopher J. McKenna; Daniel E. Rose (57) ABSTRACT

A wireless device transmits a device-to-device discovery signal using the same transmission resource that is used for transmitting uplink retransmissions to a base station by a second wireless device. The device-to-device discovery signal is transmitted at a power that is determined in accordance with a control signal received by the wireless device from the base station. In an example, the wireless device transmits the device-to-device discovery signal on an uplink control channel established for use for sending uplink control signals to the base station.

21 Claims, 2 Drawing Sheets

(56) References Cited

U.S. PATENT DOCUMENTS

| | | | |
|---|---|---|---|
| 2009/0325625 A1 | 12/2009 | Hugl et al. | |
| 2013/0170414 A1* | 7/2013 | Kwon | 370/311 |
| 2014/0286293 A1* | 9/2014 | Jang et al. | 370/329 |

FOREIGN PATENT DOCUMENTS

| | | |
|---|---|---|
| WO | WO 2010/116220 A1 | 10/2010 |
| WO | WO 2011/011637 A2 | 1/2011 |
| WO | WO 2012/049351 A1 | 4/2012 |

OTHER PUBLICATIONS

Tdoc-RP-110707, 3GPP Work Item Description, "Study on LTE Device to Device Discovery and Communication—Radio Aspect," 3GPP TSC-RAN #52, Bratislava, Slovakia, May 31-Jun. 2, 2011, (5 pages).

Tdoc-RP-110708, 3GPP Work Item Description, "Study on LTE Device to Device Discovery and Communication—Service and System Aspects," 3GPP TSC-RAN #52, Bratislava, Slovakia, May 31-Jun. 2, 2011, (5 pages).

Klaus Doppler et al., "Device-to-Device Communication as an underlay to LTE-Advanced Networks," IEEE Communications Magazine, Dec. 2009, pp. 42-49 (8 pages).

Chia-Hao Yu et al., "Power optimization of device-to-device communication underlaying cellular communication," IEEE ICC 2009 Proceedings, 2009 (5 pages).

UKIPO Combined Search and Examination Report under Sections 17 and 18(3) dated Aug. 9, 2012 which is issued in a related UK Application No. GB1206372.3 (10 page).

UKIPO Combined Search and Examination Report under Sections 17 and 18(3) dated Dec. 12, 2012 issued in a related UK Application No. GB1217186.4 (10 page).

Erik Dahlman et al, 4G LTE/LTE-Advanced for Mobile Broadband, May 10, 2011, p. 131 (2 pages).

Eric Dahlman et al., 4G: LTE/LTE-Advanced for Mobile Broadband, Oxford, United Kingdom, Elsevier, p. 131.

* cited by examiner

METHODS AND APPARATUS FOR TRANSMITTING AND/OR CONTROLLING DEVICE-TO-DEVICE DISCOVERY SIGNALS

CROSS REFERENCE TO RELATED APPLICATION

This application claims the benefit under 35 U.S.C. §119 and 37 CFR 1.55 to UK Patent Application No. GB 1206372.3, filed on Apr. 11, 2012, the entire content of which is incorporated herein by reference.

TECHNICAL FIELD

The present disclosure relates to a method and apparatus for transmitting a device-to-device discovery signal, and to a method and apparatus for controlling transmission of a device-to-device discovery signal.

BACKGROUND

The following abbreviations which may be found in the specification and/or the drawing figures are defined as follows:
ACK acknowledgement
D2D device-to-device
eNB, eNodeB evolved Node B/base station in an E-UTRAN system
E-UTRAN Evolved UTRAN (LTE)
FDD frequency division duplex
GSM Global System for Mobile Communications
HARQ hybrid automatic repeat request
LTE Long Term Evolution
LTE-A Long Term Evolution Advanced
M2M machine-to-machine
MTC machine-type communication
NACK negative acknowledgement
OFDM orthogonal frequency-division multiplexing
PDSCH physical downlink shared channel
PDCCH physical downlink control channel
PHICH physical HARQ indicator channel
PUCCH physical uplink control channel
PUSCH physical uplink shared channel
RTT round trip time
TDD time division duplex
Tx transmission
UE user equipment
UMTS Universal Mobile Telecommunications System
UTRAN Universal Terrestrial Radio Access Network
WCDMA Wideband Code Division Multiple Access D2D communications have been the subject of increasing research in recent years. D2D encompasses direct communication among portable devices without utilising nodes/base stations of an infrastructure-based wireless network (typically a cellular network, such as GSM, WCDMA, LTE or the like). D2D communications reduce the load on base stations/wireless networks and also presents new service opportunities. There is a subset of D2D commonly termed M2M (or equivalently MTC) which refers to automated communications from and to radio devices that are not user-controlled, such as for example smart meters, traffic monitors and many other types. Typically, M2M communications are infrequent and carry only small amounts of data compared to cellular communications and D2D communications that are not M2M. To keep costs low, given their more focused purposes, many M2M devices have quite limited capabilities as compared to conventional UEs.

Specific to LTE and LTE-A systems, there has been proposed a study item to evolve the LTE platform in order to cope with the demand of such D2D communications by studying enhancements to the LTE radio layers that allow devices to discover each other directly over the air and potentially communicate directly when viable, taking system management and network supervision into account. See for example documents Tdoc-RP-110706 entitled "On the need for a 3GPP study on LTE device-to-device discovery and communication"; Tdoc RP-110707 entitled "Study on LTE Device to Device Discovery and Communication—Radio Aspects"; and Tdoc-RP-110708 entitled "Study on LTE Device to Device Discovery and Communication—Service and System Aspects"; each by Qualcomm, Inc; TSG RAN #52; Bratislava, Slovakia; May 31-Jun. 3, 2011. Document RP-110106 describes one of the main targets is that the "radio-based discovery process needs also to be coupled with a system architecture and a security architecture that allow the 3GPP operators to retain control of the device behaviour, for example who can emit discovery signals, when and where, what information do they carry, and what devices should do once they discover each other."

One 3GPP working group is currently discussing and defining use cases and service requirements for the D2D. Such use cases include social applications, local advertising, multiplayer gaming, network offloading, smart meters and public safety. Specifically, social applications can use D2D for the exchange of files, photos, text messages, etc, VoIP conversations, one-way streaming video and two-way video conferencing. Multiplayer gaming can use D2D for exchanging high resolution media (voice & video) interactively either with all participants or only with team members within a game environment. In this gaming use case, the control inputs are expected to be received by all game participants with an ability to maintain causality. Network offloading can utilise D2D when an opportunistic proximity offload potential exists. For example, a first device can initiate transfer of a media flow from the macro network to a proximity communications session with a second device, thereby conserving macro network resources while maintaining the quality of the user experience for the media session. Smart meters can use D2D communication among low capability MTC devices, for vehicular communication (for safety and non-safety purposes), and possibly also general M2M communication among different capability devices/machines. In the public safety regime, there can be either network-controlled D2D or a pure ad hoc D2D which does not utilise any network infrastructure for setting up or maintaining the D2D links. These are the two main categories of D2D networks, one taking place under control of a controlling (cellular) network and typically using licensed spectrum, and the other being ad hoc D2D which can work autonomously without network coverage.

In the cellular-controlled approach, the discovery communications, by which devices can discover each other's presence, are likely to be multiplexed with the (normal) cellular communications taking place on the same radio resources. However, it is important to ensure that these discovery communications do not interfere with or otherwise affect the operation of other devices using the cellular network with the (normal) cellular communications that conventionally take place, whether these other devices are also involved in D2D communications or not.

SUMMARY

According to first embodiments of the present disclosure, there is a method of transmitting a device-to-device discovery signal, the method including:

a wireless device transmitting a device-to-device discovery signal using the same transmission resource that is used for transmitting uplink retransmissions to a base station by a second wireless device, the device-to-device discovery signal being transmitted at a power that is determined in accordance with a control signal received by the wireless device from the base station.

According to second embodiments of the present disclosure, there is apparatus for a wireless device, the apparatus including:

at least one processor;

and at least one memory including computer program code;

the at least one memory and the computer program code being configured to, with the at least one processor, cause the wireless device at least to:

transmit a device-to-device discovery signal using the same transmission resource that is used by a second wireless device for transmitting uplink retransmissions to a base station, the device-to-device discovery signal being transmitted at a power that is determined in accordance with a control signal received by the wireless device from the base station.

According to third embodiments of the present disclosure, there is a method of controlling transmission of device-to-device discovery signals, the method including:

a base station signalling to a wireless device, which is served by the base station, a control signal that determines the transmission power used by the wireless device to transmit a device-to-device discovery signal using the same transmission resource that is used by a second wireless device for transmitting uplink retransmissions to the base station.

According to fourth embodiments of the present disclosure, there is apparatus for a base station, the apparatus including:

at least one processor;

and at least one memory including computer program code;

the at least one memory and the computer program code being configured to, with the at least one processor, cause the base station at least to:

signal to a wireless device, which is served by the base station, a control signal that determines the transmission power used by the wireless device to transmit a device-to-device discovery signal using the same transmission resource that is used by a second wireless device for transmitting uplink retransmissions to the base station.

According to fifth embodiments of the present disclosure, there is a non-transitory computer-readable storage medium including a set of computer-readable instructions stored thereon, which, when executed by a processing system of a wireless device, cause the processing system to carry out a method according to the first embodiments of the present disclosure.

Further features of embodiments will become apparent from the following description of preferred embodiments, given by way of example only, which is made with reference to the accompanying drawings.

DETAILED DESCRIPTION

According to a first embodiment of the present disclosure, there is provided a method of transmitting a device-to-device discovery signal, the method including:

a wireless device transmitting a device-to-device discovery signal using the same transmission resource that is used for transmitting uplink retransmissions to a base station by a second wireless device, the device-to-device discovery signal being transmitted at a power that is determined in accordance with a control signal received by said wireless device from the base station.

This helps prevent or minimise interference or collisions between device-to-device discovery signals being transmitted by the one device and uplink retransmissions being transmitted by a second device and which make use of the same transmission resource, which makes the method simpler to implement in existing radio access networks. As discussed below, in embodiments this for example allows priority to be given to the uplink retransmissions. It will be understood that in general, the devices may each be transmitting device-to-device discovery signals and uplink retransmissions on the same transmission resource, albeit at different times so that, at a particular time instant, a device may be transmitting device-to-device discovery signals and, at another time instant, may be transmitting uplink retransmissions.

In an embodiment, the wireless device transmits the device-to-device discovery signal on an uplink control channel established for use for sending uplink control signals to the base station. Making use of transmission resources that have already been allocated (for a different purpose) makes the method simpler to implement in existing radio access networks. In an embodiment, the wireless device transmits the device-to-device discovery signal at a frequency that alternates over time between two frequencies that are at the respective edges of the frequency bandwidth of the uplink control channel.

In an embodiment, the wireless device transmits the device-to-device discovery signal at a frequency that varies over time. This helps to minimise received interference, and interference caused to the transmissions of other devices, particularly if they are retransmitting incorrectly received data packets at the same or a similar frequency.

In general, the network/base station will typically have control over the frequency hopping regimes used by the wireless devices in the embodiments discussed above, transmitting control signals to the wireless devices for this purpose as necessary, though at least some of the wireless devices may control this themselves in some embodiments.

In an embodiment, the device-to-device discovery signal is transmitted at a power that is determined in accordance with a control signal received from the base station based on channel conditions for the transmission channel from the wireless device to the base station. Such channel conditions may relate to path loss for example. This can be used to optimise the power used for transmissions for the uplink retransmissions and the power used for the device-to-device discovery signals respectively, for example so as to prioritise the transmission of the uplink retransmissions over the transmission of the device-to-device discovery signals whilst nevertheless attempting to ensure that each of these types of transmissions is successful.

In an embodiment, the wireless device is configured to transmit the device-to-device discovery signal at a power such that the power of the device-to-device discovery signal received at the base station is less than the power of uplink retransmissions received at the base station from other wireless devices. This allows priority to be given to transmission of uplink retransmissions and is particularly useful if the device-to-device discovery signal and the uplink retransmissions are sent using the same or similar carrier frequencies.

In an embodiment, the wireless device is configured to transmit the device-to-device discovery signal at a frequency or frequencies determined as a function of the distance of the wireless device from the base station. In an embodiment, the distance of the wireless device from the base station is measured according to path loss.

In an embodiment, the transmission resource is a Long Term Evolution Physical Uplink Control Channel. In another embodiment, the transmission resource is a Long Term Evolution Physical Uplink Shared Channel.

According to a second aspect of the present disclosure, there is provided apparatus including a processing system for a wireless device constructed and arranged to cause the wireless device to:

transmit a device-to-device discovery signal using the same transmission resource that is used by a second wireless device for transmitting uplink retransmissions to a base station, the device-to-device discovery signal being transmitted at a power that is determined in accordance with a control signal received by the wireless device from the base station.

According to a third aspect of the present disclosure, there is provided a method of controlling transmission of device-to-device discovery signals, the method including:

a base station signalling to a wireless device, which is served by the base station, a control signal that determines the transmission power used by the wireless device to transmit a device-to-device discovery signal using the same transmission resource that is used by a second wireless device for transmitting uplink retransmissions to the base station.

In an embodiment, the base station signals to wireless devices served by the base station a discovery signal power level to be used by the wireless devices when transmitting device-to-device discovery signals to the base station, said discovery signal power level being a power such that the power of device-to-device discovery signals received at the base station is less than the power of uplink retransmissions received at the base station from other wireless devices. This power level for the device-to-device discovery signals may be for example the same power level for all devices, or a power level tailored for each device depending on say measured path loss.

In an embodiment, the base station signals to wireless devices served by the base station a frequency or frequencies to be used by the wireless devices for transmitting the device-to-device discovery signals to the base station, said frequency or frequencies for each wireless device being determined as a function of the distance of said wireless device from the base station.

According to a fourth aspect of the present disclosure, there is provided apparatus including a processing system for a base station constructed and arranged to cause the base station to signal to a wireless device, which is served by the base station, a control signal that determines the transmission power used by the wireless device to transmit a device-to-device discovery signal using the same transmission resource that is used by a second wireless device for transmitting uplink retransmissions to the base station.

There may be provided a computer program including instructions such that when the computer program is executed by a processing system of a wireless device, the wireless device is arranged to carry out any of the methods as described above. There may be provided a non-transitory computer-readable storage medium including a set of computer-readable instructions stored thereon, which, when executed by a processing system, cause the processing system to carry out any of the methods as described above.

The processing systems described above may include at least one processor and at least one memory including computer program instructions, the at least one memory and the computer program instructions being configured to, with the at least one processor, cause the apparatus at least to perform as described above.

"Wireless devices" include in general any device capable of connecting wirelessly to a network, and includes in particular mobile devices including mobile or cell phones (including so-called "smart phones"), personal digital assistants, pagers, tablet and laptop computers, content-consumption or generation devices (for music and/or video for example), data cards, USB dongles, etc., as well as fixed or more static devices, such as personal computers, game consoles and other generally static entertainment devices, various other domestic and non-domestic machines and devices, etc. The term "user equipment" or UE is often used to refer to wireless devices in general, including mobile wireless devices in particular.

Reference will sometimes be made in this specification to "network", "network control apparatus" and "base station". In this respect, it will be understood that the "network control apparatus" is the overall apparatus that provides for general management and control of the network and connected devices. Such apparatus may in practice be constituted by several discrete pieces of equipment. As a particular example in the context of UMTS (Universal Mobile Telecommunications System), the network control apparatus may be constituted by for example a so-called Radio Network Controller operating in conjunction with one or more Node Bs (which, in many respects, can be regarded as "base stations"). As another example, LTE (Long Term Evolution) makes use of a so-called Evolved Node B (eNB) where the RF transceiver and resource management/control functions are combined into a single entity. The term "base station" is used in this specification to include a "traditional" base station, a Node B, an evolved Node B (eNB), or any other access point to a network, unless the context requires otherwise. Moreover for convenience and by convention, the terms "network control apparatus" and "base station" will often be used interchangeably.

Figure 1:
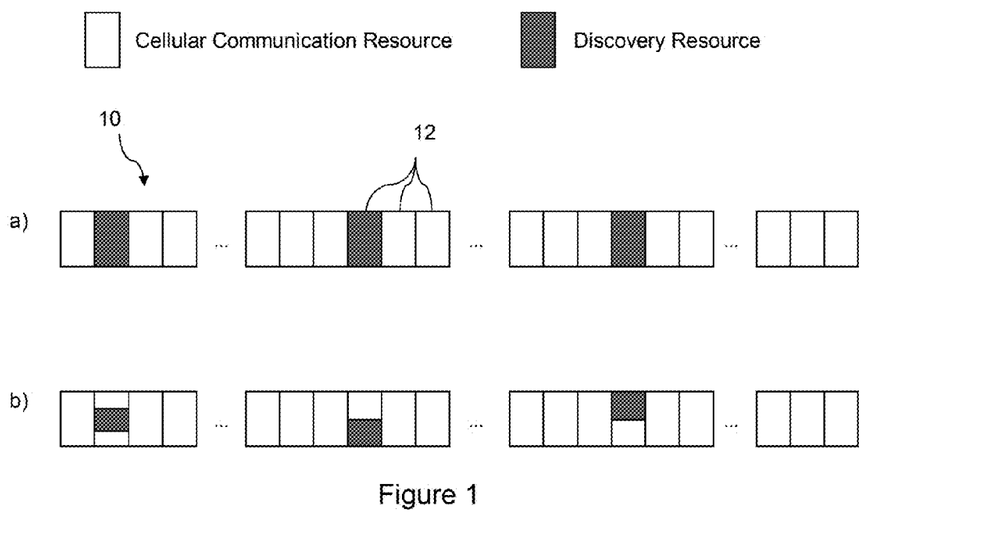
FIG. 1 shows schematically multiplexing of discovery signals with other cellular communications.

As mentioned briefly above, in the cellular-controlled approach for D2D communications, the discovery communications, by which devices can communicate directly with each other to discover each other's presence and set up D2D communications with each other, may be multiplexed with the (normal) cellular communications to and from the cell base station which are taking place on the same radio resources. This discovery function can typically be considered to happen in the background with a low duty cycle so as to have a minimal impact on the energy consumption of the devices. The radio resources for the discovery may be multiplexed in the time domain or in both the time domain and frequency domain with the cellular communications. This is illustrated schematically in FIG. 1 which shows frames (or subframes) 10 which are notionally divided into slots 12 being successively transmitted/received. The upper part a) of FIG. 1 shows multiplexing of the discovery signals with other cellular communications in the time domain only, i.e. with the discovery signals (shown with shading) using a particular time slot in each frame with the remaining time slots being used by other cellular communications (shown with no shading). The lower part b) of FIG. 1 shows multiplexing of the discovery signals with other cellular communications in the time domain and frequency domain, with frequency being indicated vertically. As shown, discovery signals that are spaced in time also use different frequencies.

Here it is noted that in LTE (Long Term Evolution) Release 8 onwards, the first few symbols of each downlink subframe over the whole operating bandwidth are reserved for control channels, referred to as the PDCCH. Control signals sent over these downlink control channels include for example a format indicator to indicate the number of OFDM symbols used for control in this subframe, scheduling control information (downlink assignment and uplink scheduling grant), and downlink ACKs/NACKs (acknowledgement and negative acknowledgements) associated with uplink data transmission, which is used for HARQ (hybrid automatic repeat request) for error correction. On the other hand, uplink control signals are located at the outer edges of the operating bandwidth. These uplink control signals include for example ACKs/NACKs associated with downlink data transmission, channel quality indicators and scheduling request indicators. This frequency location of the uplink control signals is shown schematically in FIG. 2. In the first slot 14 of a subframe 16, the lower end of the available uplink spectrum is used for the uplink control channel 18, and the higher end of the available uplink spectrum is used for the uplink control channel 18 in the second slot 14' of the subframe 16. This so-called frequency diversity assists in minimising the effect of interference to these control channels caused by other transmissions in the radio environment as well as the interference effect of transmission of these control channels on other nearby devices. In the case of LTE, these uplink control signals are sent over an uplink control channel 18 known as PUCCH (Physical Uplink Control Channel) which is transmitted on a reserved frequency region in the uplink. Similar physical uplink control channels are known and used in other radio access technologies.

These uplink control signals in a cellular system, including for example an LTE system, are important and therefore it is typically important to ensure that the effect of any D2D activity on these is minimised or avoided altogether. This is particularly the case for the HARQ ACK/NACK signals as these are critical for effective error control in a cellular system such as LTE. However, particular problems arise for the uplink given that the cellular uplink control signals are transmitted using all symbols/slots in the time domain (i.e. they effectively fill the time periods allowed for transmission).

Figure 3:
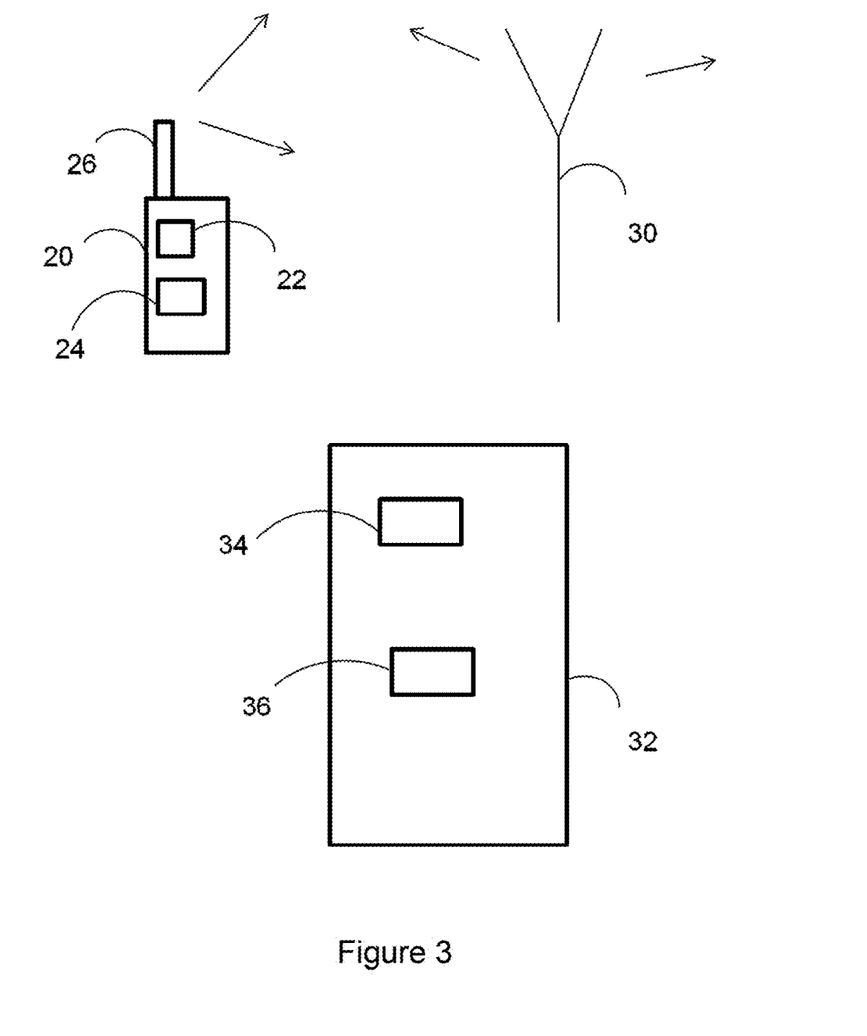
FIG. 3 shows schematically an example of a wireless device, a base station and a network control apparatus.

FIG. 3 shows schematically an example of a wireless device 20. The wireless device 20 contains radio module 22, processor(s) and memory/memories 24, antenna 26, etc. for enabling wireless communication with the network. The wireless device 20 in use is in communication with a radio mast 30. As a particular example in the context of UMTS (Universal Mobile Telecommunications System), there may be a network control apparatus 32 (which may be constituted by for example a so-called Radio Network Controller) operating in conjunction with one or more Node Bs (which, in many respects, can be regarded as "base stations"). As another example, LTE (Long Term Evolution) makes use of a so-called Evolved Node B (eNB) where the RF transceiver and resource management/control functions are combined into a single entity. The term "base station" is used in this specification to include a "traditional" base station, a Node B, an evolved Node B (eNB), or any other access point to a network, unless the context requires otherwise. The network control apparatus 32 (of whatever type) may have its own processor(s) 34 and memory/memories 36, etc.

In accordance with an example of one embodiment of the present disclosure, a wireless device 20 that is operating in a cellular network under the control of some network control apparatus 32 and that wishes to transmit a D2D discovery signal is allocated or assigned use of an uplink control channel for sending the D2D discovery signal(s). In one embodiment, this uplink control channel uses a frequency that is different from the frequency or range of frequencies used by the wireless device 20, and by other wireless devices in the same cellular network, for sending uplink user data. The principal purpose of this is to prevent or at least minimise interference to uplink cellular signals that are being received at the base station from other wireless devices, including in particular uplink synchronous retransmissions that are being received at the base station from other wireless devices, such interference potentially being caused by the sending of D2D discovery signals by the wireless device 20 on the uplink control channel. It is preferred that frequency hopping is used for the transmission of the D2D discovery signals on the uplink control channel, that is the transmission frequency is varied or switched over time between two or more frequencies, in order to minimise further the interference that might be caused by the D2D discovery signals.

The following discussion of a specific example is given in respect of wireless devices operating according to LTE. It will be appreciated however that much of the following can be applied to wireless devices operating according to other wireless standards using different radio access technologies.

Figure 2:
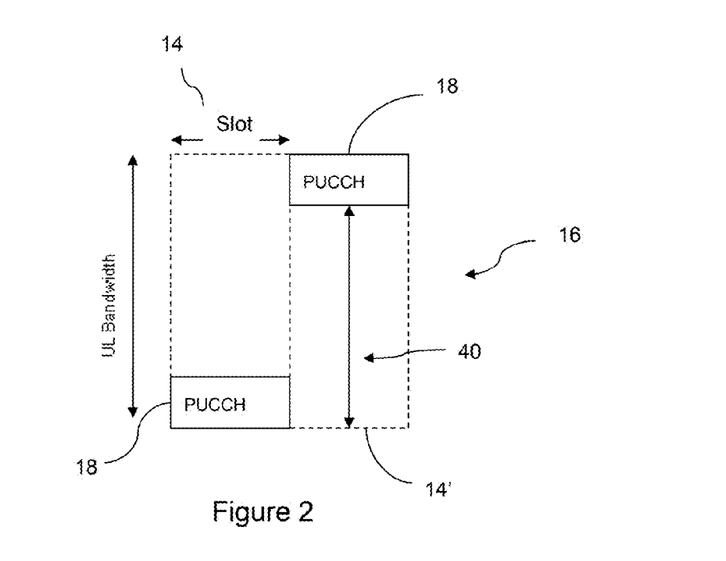
FIG. 2 shows schematically an uplink transmission frame.

In one embodiment, the wireless devices 20 in a cell that wish to transmit D2D discovery signals are allocated or assigned the resources on the PUCCH region 18 of the uplink resources for these discovery signal transmissions (see FIG. 2). As mentioned above, the PUCCH region 18 is a reserved frequency region in the uplink normally used for wireless devices 20 in a cell to transmit uplink cellular control signals, including in particular ACKs/NACKs associated with downlink data transmission, channel quality indicators and scheduling request indicators. When a wireless device 20 operating in an LTE system wishes to send user data, this is sent in the PUSCH region 40 shown schematically in FIG. 2, that is, the region of the uplink bandwidth that is not reserved for PUCCH transmissions. 18 Also, in normal use, when a wireless device 20 is sending user data, using the PUSCH region 40, control information is not sent in the PUCCH region 18 but is instead multiplexed with the user data in the PUSCH region 40.

By allocating the PUCCH region 18 for use by wireless devices 20 as and when needed for transmitting D2D discovery signals, interference to and from other wireless devices that are transmitting using the PUSCH region is minimised or avoided. Those other wireless devices 20 will be making use of the cellular network and may for example be transmitting over the PUSCH region for retransmission of the wireless devices 20 according to the HARQ protocol, for error correction purposes, and it is particularly important to minimise the impact of the D2D discovery transmissions on these cellular retransmissions. Thus, this arrangement enables the base station or eNB 30 to dynamically control the uplink resources in the frequency domain over the whole of the PUSCH region, for example by signalling sent to the wireless devices 20 over the PDCCH, particularly for the retransmissions sent by the wireless devices 20 without concern for the interference which might caused by the other nearby wireless devices that are transmitting D2D discovery signals, and vice versa. To minimise further the effects of interference, in one arrangement, the discovery signals are transmitted using frequency hopping, which may be according to the known PUCCH hopping pattern or similar. This frequency hopping scheme is discussed above in relation to FIG. 2.

This allocation of resources on the PUCCH region 18 of the uplink resources for the discovery signal transmissions may only be given to wireless devices 20 that are close to the eNB 30, as determined for example by measured path loss. In general, these are the wireless devices 20 that are most likely to cause interference to and suffer interference from other wireless devices 20 in the cell.

In accordance with examples of embodiments of the present disclosure, various power control options may be employed to optimise operation, depending on the circumstances. Thus, the discovery signals are transmitted by the wireless devices 20 at a power that is determined in accordance with a control signal received by the wireless device 20 from the eNB 30 or other base station. In one example, the eNB 30 informs wireless devices 20 operating in the cell that is serviced by the eNB 30 about which frequency resources of the periodical uplink discovery resources in the PUCCH regions 18 shall use power reduction based on for example the channel conditions towards the eNB 30, such as path loss. Here it is mentioned that path loss is in general the main factor for setting the transmission power to be used by the wireless device 20, such as a UE. The eNB 30 may provide several compensation factors to take into account, e.g. path loss compensation factor, target received power level at the base station, etc. Furthermore, other factors, such as for example transmission bandwidth and the type of data to be sent (e.g. basic data or control data, re-transmission data, etc.) may affect the used power. In an embodiment, the eNB 30 could for example signal, via PDCCH, for the incoming discovery transmission subframes in uplink a common power reduction factor which is to be used on certain frequency resources, namely those for which the eNB 30 has scheduled uplink retransmission(s) for the cellular communications. The eNB 30 could also allocate a higher transmission power for the PUSCH retransmission in question which is to be used while the retransmission takes place on resources that are also used for the D2D discovery transmission.

Furthermore, the eNB 30 could configure the cellular retransmissions to use frequency hopping. In a particular example of this, the uplink D2D discovery resources that overlap with certain specified frequency resources, such as those allocated for uplink retransmissions, are configured by the NB 30 to use frequency hopping in order to randomise any interference, in this example towards the uplink retransmissions.

It may be determined that cellular uplink retransmissions are more important than D2D discovery signals. Thus, in one embodiment the cellular uplink retransmission of a wireless device 20 that is also a D2D discovery transmitter or receiver is prioritised over D2D discovery signal transmission or reception. In one example of this, the wireless device 20 may be configured to transmit the D2D discovery signal simultaneously with an uplink retransmission only if the frequency resources of these two sets of transmissions do not overlap and also the maximum power headroom for the total transmission is not exceeded; otherwise, transmission of the D2D discovery signal is inhibited or postponed in favour of allowing the cellular uplink retransmissions to take place.

In one embodiment, the uplink resources from the D2D discovery signal transmission point of view are allocated in frequency to regions according to the distance of the wireless device 20 from the eNB 30, i.e. different frequency resources are allocated to different wireless devices 20 according to their distance from the eNB 30. This may for example be by notionally dividing the wireless devices 20 into groups, such as the wireless devices 20 close to the eNB 30, the wireless devices 20 at an intermediate distance from the eNB 30, and the wireless devices 20 that are distant from the eNB 30 such as those at the cell edge. This allows the scheduler at the eNB 30 to schedule retransmission(s) to take place on resources used by wireless devices 20 that are transmitting D2D discovery signals that are not causing significant interference to the eNB 30.

Although at least some aspects of embodiments described herein with reference to the drawings include computer processes performed in processing systems or processors, embodiments also extend to computer programs, particularly computer programs on or in a carrier, adapted for putting embodiments into practice. The program may be in the form of non-transitory source code, object code, a code intermediate source and object code such as in partially compiled form, or in any other non-transitory form suitable for use in the implementation of processes according to embodiments. The carrier may be any entity or device capable of carrying the program. For example, the carrier may include a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc. It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), etc. The chip or chips may include circuitry (as well as possibly firmware) for embodying at least one or more of a data processor or processors, a digital signal processor or processors, baseband circuitry and radio frequency circuitry, which are configurable so as to operate in accordance with the example embodiments. In this regard, the example embodiments may be implemented at least in part by computer software stored in (non-transitory) memory and executable by the processor, or by hardware, or by a combination of tangibly stored software and hardware (and tangibly stored firmware).

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of transmitting a device-to-device discovery signal, the method comprising:
a wireless device transmitting a device-to-device discovery signal using an uplink control channel established for transmitting uplink retransmissions to a base station by a second wireless device, the device-to-device discovery signal being transmitted at a power that is determined in accordance with a control signal received by the wireless device from the base station.

2. The method according to claim 1, the device-to-device discovery signal being transmitted at a power that is determined in accordance with a control signal received from the base station based on channel conditions for the transmission channel from the wireless device to the base station.

3. The method according to claim 1, wherein the wireless device is configured to transmit the device-to-device discovery signal at a power such that the power of the device-to-device discovery signal received at the base station is less than the power of uplink retransmissions received at the base station from other wireless devices.

4. The method according to claim 1, wherein the wireless device is configured to transmit the device-to-device discovery signal at a frequency or frequencies determined as a function of the distance of the wireless device from the base station.

5. The method according to claim 1, wherein the transmission resource is a Long Term Evolution Physical Uplink Shared Channel or a Long Term Evolution Physical Uplink Control Channel.

6. An apparatus for a wireless device, the apparatus comprising:
at least one processor;
and at least one memory including computer program code;
the at least one memory and the computer program code being configured to, with the at least one processor, cause the wireless device at least to:
transmit a device-to-device discovery signal using the same transmission resource that is used by a second wireless device for transmitting uplink retransmissions to a base station, the device-to-device discovery signal being transmitted at a power that is determined in accordance with a control signal received by the wireless device from the base station and at a frequency determined as a function of the distance of the wireless device from the base station.

7. The apparatus according to claim 6, arranged to cause the wireless device to transmit the device-to-device discovery signal on an uplink control channel established for use for sending uplink control signals to the base station.

8. The apparatus according to claim 6, arranged to cause the wireless device to transmit the device-to-device discovery signal at a power that is determined in accordance with a control signal received from the base station based on channel conditions for the transmission channel from the wireless device to the base station.

9. The apparatus according to claim 6, arranged to cause the wireless device to transmit the device-to-device discovery signal at a power such that the power of the device-to-device discovery signal received at the base station is less than the power of uplink retransmissions received at the base station from other wireless devices.

10. The apparatus according to claim 6, configured for use in a Long Term Evolution system or a Long Term Evolution-Advanced system.

11. A user equipment comprising apparatus according to claim 6.

12. A method of controlling transmission of device-to-device discovery signals, the method comprising:
a base station signalling to a wireless device, which is served by the base station, a control signal that determines the transmission power used by the wireless device to transmit a device-to-device discovery signal using the same transmission resource that is used by a second wireless device for transmitting uplink retransmissions to the base station,
wherein the wireless device selects a transmission power for the device-to-device discovery signal, responsive to the control signal, such that the power of the device-to-device discovery signal received at the base station is less than the power of uplink retransmissions received at the base station from other wireless devices.

13. The method according to claim 12, wherein the power that is determined in accordance with the control signal is based on channel conditions for the transmission channel from the wireless device to the base station.

14. The method according to claim 12, wherein the control signal is such as to cause the wireless device to transmit the device-to-device discovery signal at a frequency or frequencies determined as a function of the distance of the wireless device from the base station.

15. The method according to claim 12, wherein the transmission resource is a Long Term Evolution Physical Uplink Shared Channel or a Long Term Evolution Physical Uplink Control Channel.

16. An apparatus for a base station, the apparatus comprising:
at least one processor;
and at least one memory including computer program code;
the at least one memory and the computer program code being configured to, with the at least one processor, cause the base station at least to:
signal to a wireless device, which is served by the base station, a control signal that determines the transmission power used by the wireless device to transmit a device-to-device discovery signal using a Long Term Evolution Physical Uplink Shared Channel or a Long Term Evolution Physical Uplink Control Channel that is used by a second wireless device for transmitting uplink retransmissions to the base station.

17. The apparatus according to claim 16, arranged such that the power that is determined in accordance with the control signal is based on channel conditions for the transmission channel from the wireless device to the base station.

18. The apparatus according to claim 16, arranged such that the control signal is such as to cause the wireless device to transmit the device-to-device discovery signal at a power such that the power of the device-to-device discovery signal received at the base station is less than the power of uplink retransmissions received at the base station from other wireless devices.

19. The apparatus according to claim 16, arranged such that the control signal is such as to cause the wireless device to transmit the device-to-device discovery signal at a frequency or frequencies determined as a function of the distance of the wireless device from the base station.

20. The apparatus according to claim 16, configured for use in a Long Term Evolution system or a Long Term Evolution-Advanced system.

21. A non-transitory computer-readable storage medium comprising a set of computer-readable instructions stored thereon, which, when executed by a processing system of a wireless device, cause the processing system to carry out a method according to claim 1.

\* \* \* \* \*